United States Patent
Zhang et al.

(10) Patent No.: US 11,495,011 B2
(45) Date of Patent: Nov. 8, 2022

(54) TEMPLATE-BASED KEY-VALUE EXTRACTION FOR INFERRING OCR KEY VALUES WITHIN FORM IMAGES

(71) Applicant: salesforce.com, inc., San Francisco, CA (US)

(72) Inventors: Shu Zhang, Palo Alto, CA (US); Chetan Ramaiah, Palo Alto, CA (US); Ran Xu, Palo Alto, CA (US); Caiming Xiong, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 98 days.

(21) Appl. No.: 16/988,536

(22) Filed: Aug. 7, 2020

(65) Prior Publication Data

US 2022/0044058 A1  Feb. 10, 2022

(51) Int. Cl.
  *G06K 9/00* (2022.01)
  *G06V 10/75* (2022.01)
  *G06K 9/62* (2022.01)
  *G06V 10/22* (2022.01)
  *G06V 30/414* (2022.01)
  *G06V 30/10* (2022.01)

(52) U.S. Cl.
  CPC ......... *G06V 10/751* (2022.01); *G06K 9/6256* (2013.01); *G06V 10/22* (2022.01); *G06V 30/414* (2022.01); *G06V 30/10* (2022.01)

(58) Field of Classification Search
  CPC .... G06V 10/751; G06V 10/22; G06V 30/414; G06V 30/10; G06K 9/6256
  See application file for complete search history.

(56) References Cited

U.S. PATENT DOCUMENTS

| | | | |
|---|---|---|---|
| 6,778,703 B1 * | 8/2004 | Zlotnick | G06K 9/00449 382/218 |
| 10,896,357 B1 * | 1/2021 | Corcoran | G06K 9/6262 |
| 11,361,532 B1 * | 6/2022 | Martin | G06T 3/20 |
| 2009/0016605 A1 * | 1/2009 | Chao | G06F 40/186 382/176 |
| 2016/0371246 A1 * | 12/2016 | Deepak | G06F 40/186 |

(Continued)

OTHER PUBLICATIONS

Blum, J. et al., "A New Tool for Taming Business-Card Clutter," Oct. 27, 2011, 17 pages, [Online] [Retrieved on Aug. 3, 2021] Retrieved from the Internet <URL: https://www.entrepreneur.com/article/220610>.

(Continued)

*Primary Examiner* — Oneal R Mistry
(74) *Attorney, Agent, or Firm* — Fenwick & West LLP

(57) ABSTRACT

The system has a form analysis module that receives an image of a form into which values have been filled for the possible fields of information on the form, such as first name, address, age, and the like. By using a library of form templates, a form analysis module allows both flexibility of form processing and simplicity for the user. That is, the techniques used by the form analysis module allow the processing of any form image for which the library has a form template example. The form image need not precisely match any form template, but rather may be scaled or shifted relative to a corresponding template. Additionally, the user need only provide the form image itself, without providing any additional exemplars, metadata for training, or the like.

20 Claims, 6 Drawing Sheets

System 100

(56) References Cited

U.S. PATENT DOCUMENTS

2017/0132866 A1\* 5/2017 Kuklinski .............. G06K 9/626
2020/0074169 A1\* 3/2020 Mukhopadhyay .... G06F 40/174
2020/0175304 A1\* 6/2020 Vig ......................... G06N 3/08
2021/0124919 A1\* 4/2021 Balakrishnan ....... G06V 30/245

OTHER PUBLICATIONS

AWS, "Amazon Textract features," Date Unknown, six pages, [Online] [Retrieved on Sep. 14, 2020] Retrieved from the Internet <URL: https://aws.amazon.com/textract/features/>.

Microsoft, "What is Form Recognizer?," Aug. 5, 2020, eight pages, [Online] [Retrieved on Sep. 14, 2020] Retrieved from the Internet <URL: https://docs.microsoft.com/en-us/azure/cognitive-services/form-recognizer/overview>.

\* cited by examiner

TEMPLATE-BASED KEY-VALUE EXTRACTION FOR INFERRING OCR KEY VALUES WITHIN FORM IMAGES

FIELD OF ART

This disclosure relates generally to computer systems and machine learning techniques for inferring locations of data within different types of form images submitted by client devices.

BACKGROUND

Users of computer systems often wish to automatically obtain the values entered into forms. For example, a company that processes paper mortgage applications with handwritten values may wish to obtain the values from the mortgage applications (e.g., name, address, income, etc.) so that it can process the applications. As another example, a company that performs background checks on potential employees may wish to obtain the values describing the job applicants (e.g., name, gender, date of birth) from copies of their driver licenses or other identity cards. It is of course preferable that the process of obtaining the values be as automated and flexible as possible, not requiring additional user input other than the form itself, and working for forms with many different visual layouts.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
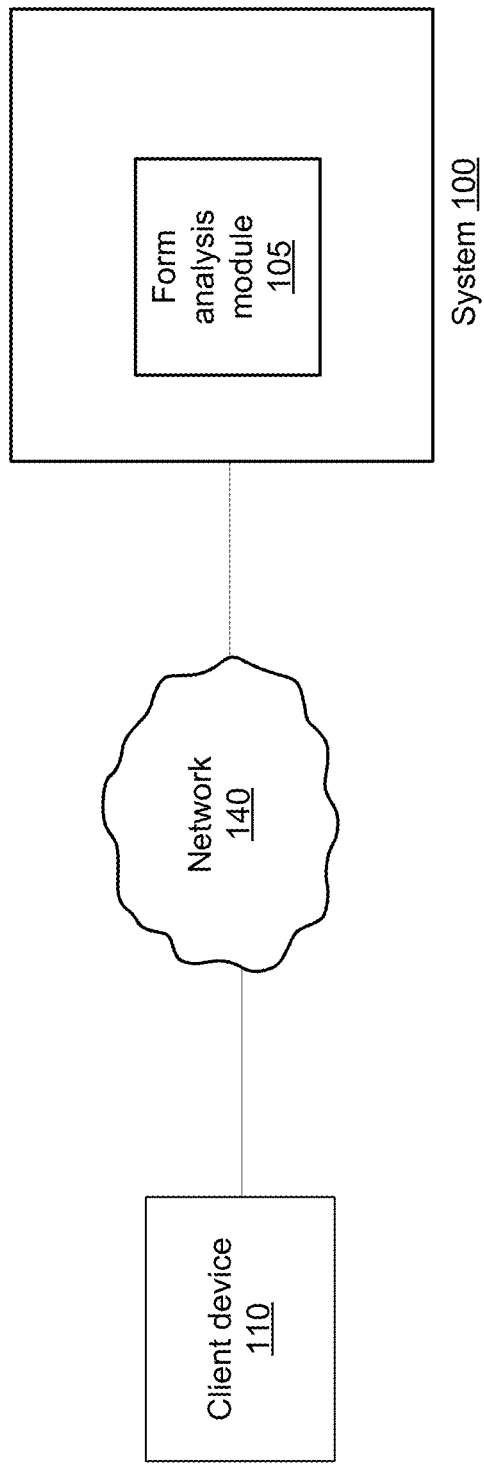
FIG. 1 illustrates the modules of a system in which key-value text may be extracted from a form image, according to some embodiments.

FIG. 1 illustrates the modules of a system 100, according to some embodiments. The system 100 has a form analysis module 105 that receives an image of a form into which values have been filled (hereinafter "user form image," or simply "form image") for the possible fields of information on the form, such as first name, address, age, and the like. A form might be, for example, a driver license, a passport, a permanent resident card, a W2 salary form, a form 1040 or K1, or a paystub. The term "key" is used herein to refer to the identity of a particular field, and a "key-value pair" to a particular key along with a value entered into a user form image corresponding to that key (e.g., the value "Richard" along with the key "First name"). The user form image may be received over the network 140 of FIG. 1, either in response to submission of the image using an API of the system 100, or by the user using a graphical user interface (e.g., a web-based interface) to specify the files to be submitted.

The form analysis module 105 analyzes the user form image with respect to a library of form templates (or "template" for brevity), e.g., the library constituting a database, and locates the values for the various keys on the user image form. The system 100 may provide the key-value pairs to the client device 110 of a user that submitted the user form image, which the user may then use to perform additional processing related to the form, such as determining whether an applicant submitting a mortgage application form is qualified for the mortgage.

By using a library of form templates, the form analysis module 105 allows both flexibility of form processing and simplicity for the user. That is, the techniques used by the form analysis module 105 allow the processing of any form image for which the library has a form template example. The form image need not precisely match any form template, but rather may be scaled or shifted relative to a corresponding template. Additionally, the user need only provide the form image itself (and, in some embodiments, an indicator of the general template class for the image, such as "driver license"), without providing any additional image exemplars, metadata for training, or the like.

Figure 2A:
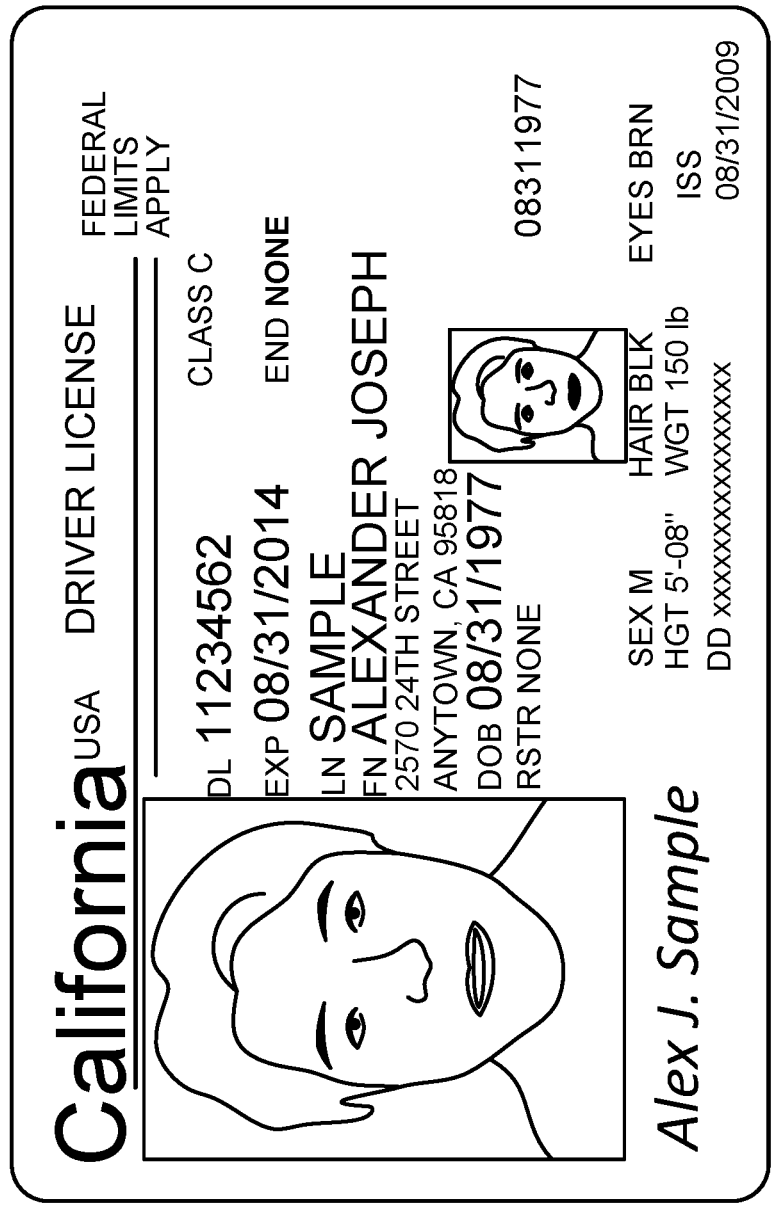
FIGS. 2A and 2B illustrate examples of the user form images that may be processed and the form templates used for processing them, according to some embodiments.
Figure 2B:
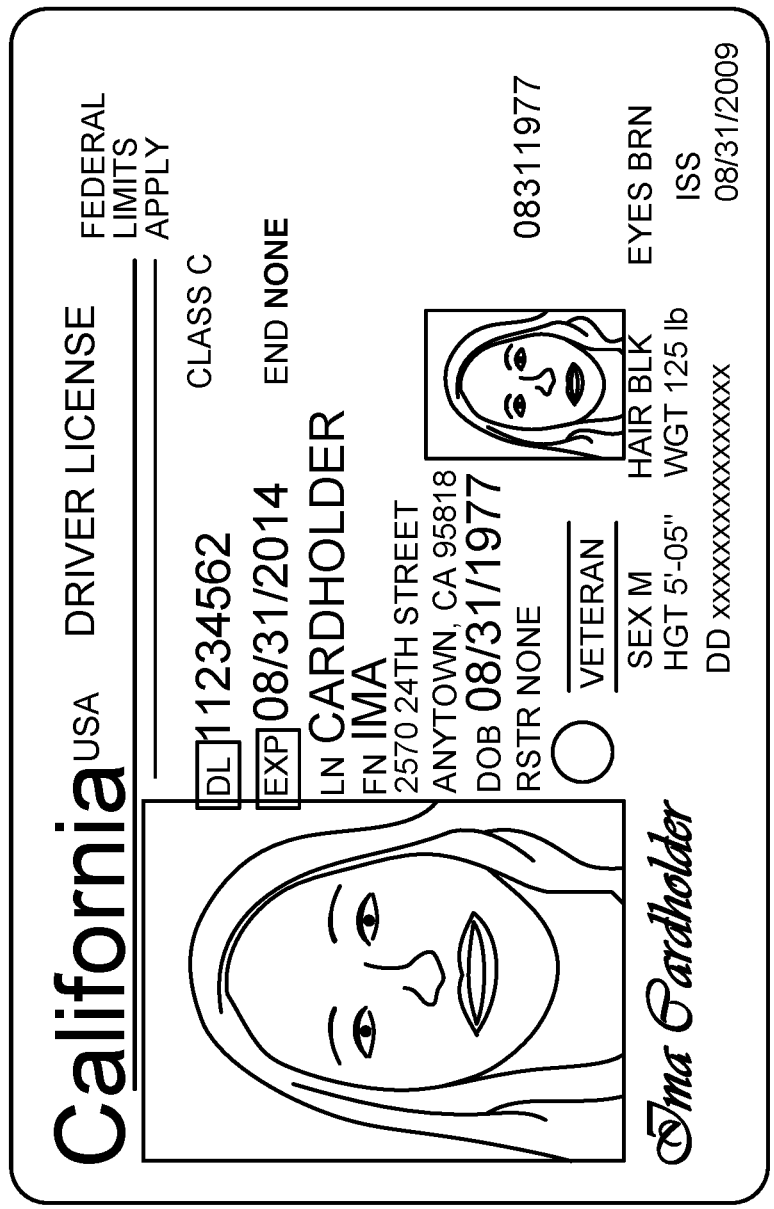

FIGS. 2A and 2B illustrate examples of the user form images that may be processed and the form templates used for processing them, according to some embodiments. FIG. 2A, for example, illustrates an image of a particular form: namely, a California driver license. A user may wish to automatically determine information about the owner of the driver license from the form image, such as the user's license number, license expiration, name, address, date of birth, and the like. However, doing so is not trivial. For example, although some keys (such as driver license ID (labeled "DL") and expiration date (labeled "EXP") are labeled directly on the form, other keys (such as address) have only their values (e.g., "2570 24$^{th}$ Street"), without a label for the indicating the key name. In such cases in which a key label is lacking, even a human observer might not be able to readily determine what the value represents, and many other alternative approaches to processing the image will fail to correlate the text with the proper key. Further, the value for a given key need not be a single word, but could contain an arbitrary number of words (e.g., first name "Alexander Joseph"), and could span multiple lines. Still further, the image of the user form may be scaled or shifted in different manners. For example, the image of a driver license might appear bigger or smaller based on a distance from which a picture of it was taken, and driver license could be located at different offsets from the top-left of the image.

FIG. 2B is a visual representation of one particular form template, in this case representing a California driver license. The form template need not include actual image data, as in FIG. 2B, which is shown for purposes of illustration. For example, in one embodiment form templates merely store identifiers of keys and corresponding indicators of regions of an image in which the keys are located. For instance, in an embodiment in which the form templates are represented in JSON format, the following snippet might describe the location of the key "hk", a textual label for which is located within a form region whose bounding box extends from pixel <916, 259> to pixel <1007, 292>, and whose value is located within a form region whose bounding box extends from pixel <1010, 250> to pixel <1051, 291>.

```
{
    "key": {
        "label": "class",
        "tag": "hk",
        "bbox": {
            "xmin": 916,
            "ymin": 259,
            "xmax": 1007,
            "ymax": 292
        }
    }
    "value": {
        "label": "\"\"",
        "tag": "hv",
        "bbox": {
            "xmin": 1010,
            "ymin": 250,
            "xmax": 1051,
            "ymax": 291
        }
    }
}
```

Once a particular form image is processed, it can be represented with similar data structures (with different values for the "label" keys), such as the following for the key and value "FN" in FIG. 2A:

```
{
    "key": {
        "label": "FN",
        "tag": "hk, $FirstName$",
        "bbox": {
            "xmin": 916,
            "ymin": 259,
            "xmax": 1007,
            "ymax": 292
        }
    }
    "value": {
        "label": "ALEXANDER JOSEPH",
        "tag": "hv",
        "bbox": {
            "xmin": 1010,
            "ymin": 250,
            "xmax": 1051,
            "ymax": 291
        }
    }
}
```

Returning again to FIG. 1, the form analysis module 105 has a template library of possible forms and corresponding metadata about the locations of data on those particular template forms. Given a particular form image from a user, the form analysis module 105 selects a most applicable template from the template library. Based on a comparison of the selected template form with the user form image, the form analysis module 105 determines how to predict where the data regions would be on the user form image. The form analysis module 105 uses the predictions to extract the form values from the form image and provide those values back to the user. This technique functions properly regardless of whether the user form image has been scaled or shifted relative to the selected template, and can obtain values for a key regardless of whether the form image contains key label text.

Figure 3:
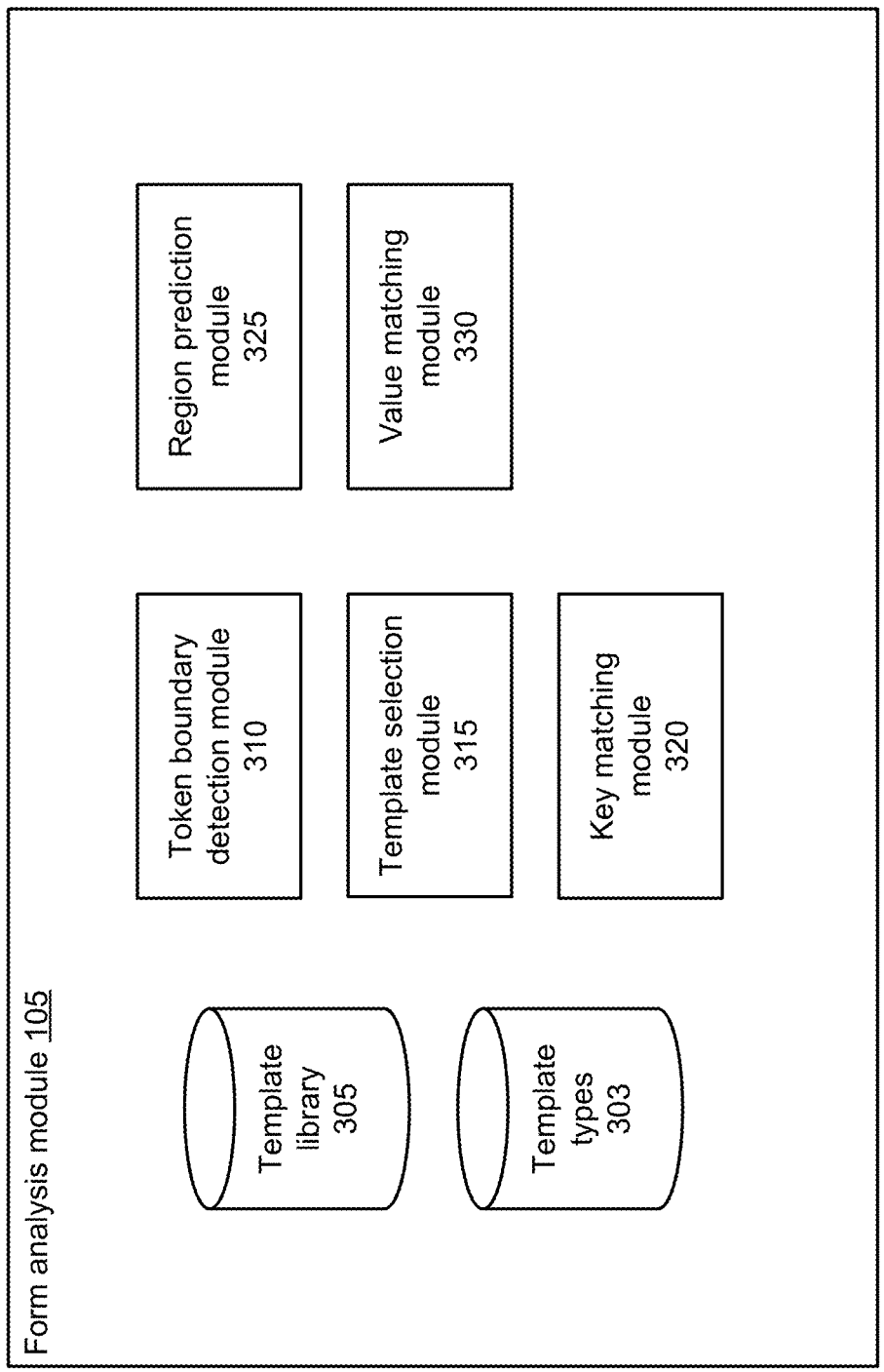
FIG. 3 illustrates the modules of the form analysis module of FIG. 1, according to some embodiments.

FIG. 3 illustrates the modules of the form analysis module 105 of FIG. 1, according to some embodiments.

The form analysis module 105 includes, or has access to, a template library 305. The template library 305 contains a number of different form templates, such as those described with respect to FIG. 2B. The different form templates describe different types or forms (such as driver licenses, W2 salary forms, or mortgage applications), or variations of a particular type of form (such as California driver licenses, Idaho driver licenses, and Washington driver licenses). In some embodiments, the template library 305 is "flat", without differentiation between sub-types of forms. In other embodiments, the form analysis module 105 includes a set of indicators of template types 303, so as to allow differentiation between form sub-types. For example, one template type 303 could be "Driver license," which could then include different concrete subtypes within the template library 305, such as form templates for driver licenses of different states. In such embodiments, an indicator of a template type may be received along with the form template (e.g., specified by the same user that submitted the form template); alternatively, the template type can be determined by the form analysis module 105, such as by use of a model trained by a machine learning algorithm to recognize different classes of templates (e.g., "driver license" or "W2").

The form analysis module 105 further includes software modules to extract values from user form images. For example, in some embodiments, the form analysis module 105 includes a token boundary detection module 310, a template selection module 315, a key matching module 320, a region prediction module 325, and a value matching module 330. These modules are now described in more detail.

The token boundary detection module 310 takes a user form image as input and identifies the regions (e.g., as bounding boxes) in which textual units are located, as well as the text of the textual units. In embodiments in which the textual units are individual words, for example, the token boundary detection module 310 detects the region of each individual word within the user form image, as well as the text of the word. In some embodiments, the textual units are identified using a neural network.

The template selection module 315 identifies, from the template library 305, the form template that most closely corresponds to the given user form image. In embodiments in which the form analysis module 105 includes template types 303 to distinguish between different sub-types, the template selection module 315 uses a template type indicator specified by the user along with the form image to match against only the form templates that are of the specified template type; in other embodiments, the template selection module 315 matches against all the form templates in the template library 305.

The template selection module 315 can use different techniques for template matching in different embodiments. In some embodiments, the matching is accomplished by attempting to match regions in which text was found by the token boundary detection module 310 to regions in which text is expected to be found according to a given form template. The coordinates of the regions (e.g., bounding boxes) may be normalized before being compared, such as by setting calculating the shift to the top-left of the image the coordinates to begin at the top-left of the image and scaling the coordinates based on the relative sizes of the images. In some embodiments, the matching is additionally or alternatively accomplished by determining whether key label text (e.g., "DL", "EXP", or "FN" from the example of FIG. 2B)

is indeed found on the user form image, and (optionally) is more specifically found in regions where it would be expected based on the selected form template.

With a form template selected for the given user form image, the key matching module 320 processes the user form image and compares the form template with the user form image in order to infer a mapping between corresponding positions in the two. The key matching module 320 groups the individual text units identified by the token boundary detection module 310 into phrases corresponding to the values for the relevant keys. The grouping is based on degree of commonality between properties of the text units, such as (in one embodiment) font color, font face, and text unit proximity. For example, referring to FIG. 2A, the key matching module 320 might group the two text units "ALEXANDER" and "JOSEPH" into a single phrase, "ALEXANDER JOSEPH," because the text units share the same color, font face, and capitalization, and have a baseline at the same y-coordinate and the starting x-coordinate of the text unit "JOSEPH" is only slightly less than the ending x-coordinate of the text unit "ALEXANDER."

The key matching module 320 also locates the region of the key text in the user form image by adopting computing a text similarity metric (e.g., an edit distance) between the expected key text and the various regions of text located by the token boundary detection module 310 and selecting the region of text for which the text similarity metric indicates the greatest similarity.

The key matching module 320 also computes spatial relationships between key label regions and value regions of the selected form template. Returning to the example of FIG. 2, for example, the spatial relationship between the key label region having the label "FN" and its value region could be a horizontal gap of 5 pixels between the right-hand side of the label region and the left-hand side of the value region, and the spatial relationship between the key label region having the label "ISS" and its value region could be a vertical gap of 5 pixels between the bottom of the label region and the top of the value region.

The key matching module 320 also calculates a linear spatial mapping (having a shift component and a scaling component) between the selected form template and the user form image. This mapping is can be used, for example, to locate the values of keys that lack label text on the user form image. (E.g., the address "2570 24$^{th}$ Street" of FIG. 2A, as opposed to the first name "ALEXANDER JOSEPH," which does have a corresponding key label text "FN" that can be used to locate the value for that key.) The mapping can also be used to select the best match in the case of multiple key label text matches (e.g., two key label text "FN" matches, one for each of two spouses) based on a comparison of the region of the text and the region in which the text was expected to be found based on the form template. In one embodiment, in order to compute the mapping, the key matching module 320 attempts to located, within the user form image, the label text for all of the keys of the selected template (e.g., "DL," "EXP", "LN," FN," etc. as in FIG. 2A). The key matching module 320 compares the regions of the located label texts to the regions in which the label texts exist in the selected form template, deriving the horizontal and vertical shift, and horizontal and vertical scaling, to use when mapping between locations of the selected template and corresponding locations of the user form image.

The region prediction module 325 predicts, for each key of the selected form template, the region of the user image form in which the corresponding key value should be located. The prediction technique varies depending on whether a given key does or does not have label text in the user form image (which can be determined from the selected form template itself).

For a key with label text, the label text in the user form image can be used to locate the region in which the corresponding value of the key should be located. For example, in FIG. 2A, the presence of the label text "FN" can be used to locate the region containing the corresponding key value text "ALEXANDER JOSEPH." Specifically, the selected form template includes a region location for both the label text "FN" and its corresponding value located to the right of it (e.g., with a bounding box located 50 pixels to the right). This is captured by the spatial relationship that was calculated by the key matching module 320, and is used to compute a corresponding location of the value region for the key in the user form image.

For a key without label text to guide the location, the region prediction module 325 instead applies the linear spatial mapping calculated by the key matching module 320. For example, the horizontal coordinate of the value region of the key within the user form image can be computed as $xPos_{realimage}=xScale*xPos_{template}+xShift$, and the vertical coordinate can similarly be computed as $yPos_{realimage}=yScale*yPos_{template}+yShift$.

In some embodiments, the value matching module 330 identifies overlaps of text regions located by the token boundary detection module 310 with the regions predicted by the region prediction module 325, taking the text within the text regions as the value of the keys corresponding to the predicted regions. For example, referring again to FIGS. 2A and 2B, for the key "first name", the text "ALEXANDER JOSEPH" was located in a region that overlaps with the region where the value of the key "first name" was predicted to be by the region prediction module 325. Accordingly, the "first name" key is set to the value "ALEXANDER JOSEPH."

With the key values located, the system 100 can return the key-value pairs to the client device 110 of the user. In the example of FIG. 2A, the system 100 might return the key-value pairs <DL, 11234562>, <EXP, Aug. 31, 2014>, <LN, SAMPLE>, <FN, ALEXANDER JOSEPH>, <ADDRESS, 2570 24$^{th}$ STREET>, <CITY, ANYTOWN>, <STATE, CA>, <ZIP, 95818>, etc. The client device 110 could then use this data to perform a background check on the person described by the driver license, for example.

Figure 4:
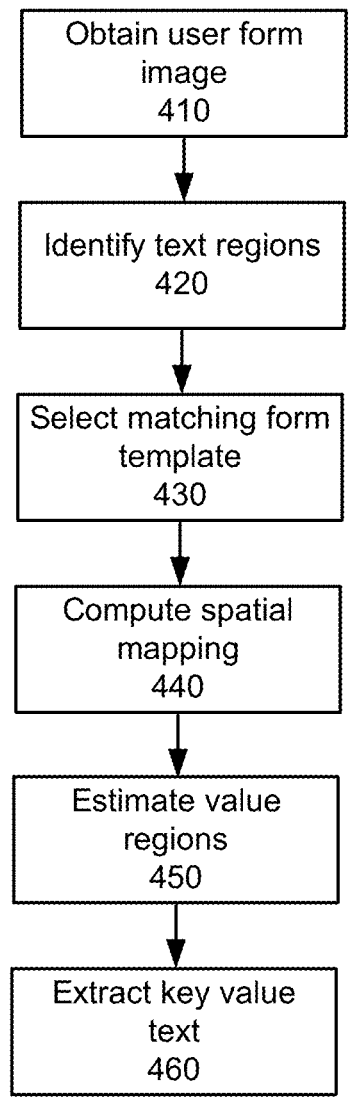
FIG. 4 is a flowchart of operations performed by the form analysis module of FIG. 1 when extracting key-value pairs from a form image, according to some embodiments.

FIG. 4 is a flowchart of operations performed by the form analysis module 105 when extracting key-value pairs from a form image, according to some embodiments.

The form analysis module 105 obtains 410 a user form image originating at a client device 110, such as by the client device 110 calling an API of the system 100, or by the user of the client device 110 manually using a graphical user interface of the system 100 to specify the form image to be analyzed.

The form analysis module 105 identifies 420 text regions of the user form image, as described above with respect to the token boundary detection module.

The form analysis module 105 selects 430 a form template from the template library 305 that best matches the given user form image, as described above with respect to the template selection module 315.

The form analysis module 105 computes 440 a spatial mapping, as described above with respect to the key matching module 320.

The form analysis module 105 estimates 450 region of the user form image expected to correspond to the values of the keys enumerated in the selected form template, as described above with respect to the region prediction module 325.

The form analysis module 105 extracts 460 values for the keys corresponding to the estimated value regions, as described above with respect to the value matching module 330.

Figure 5:
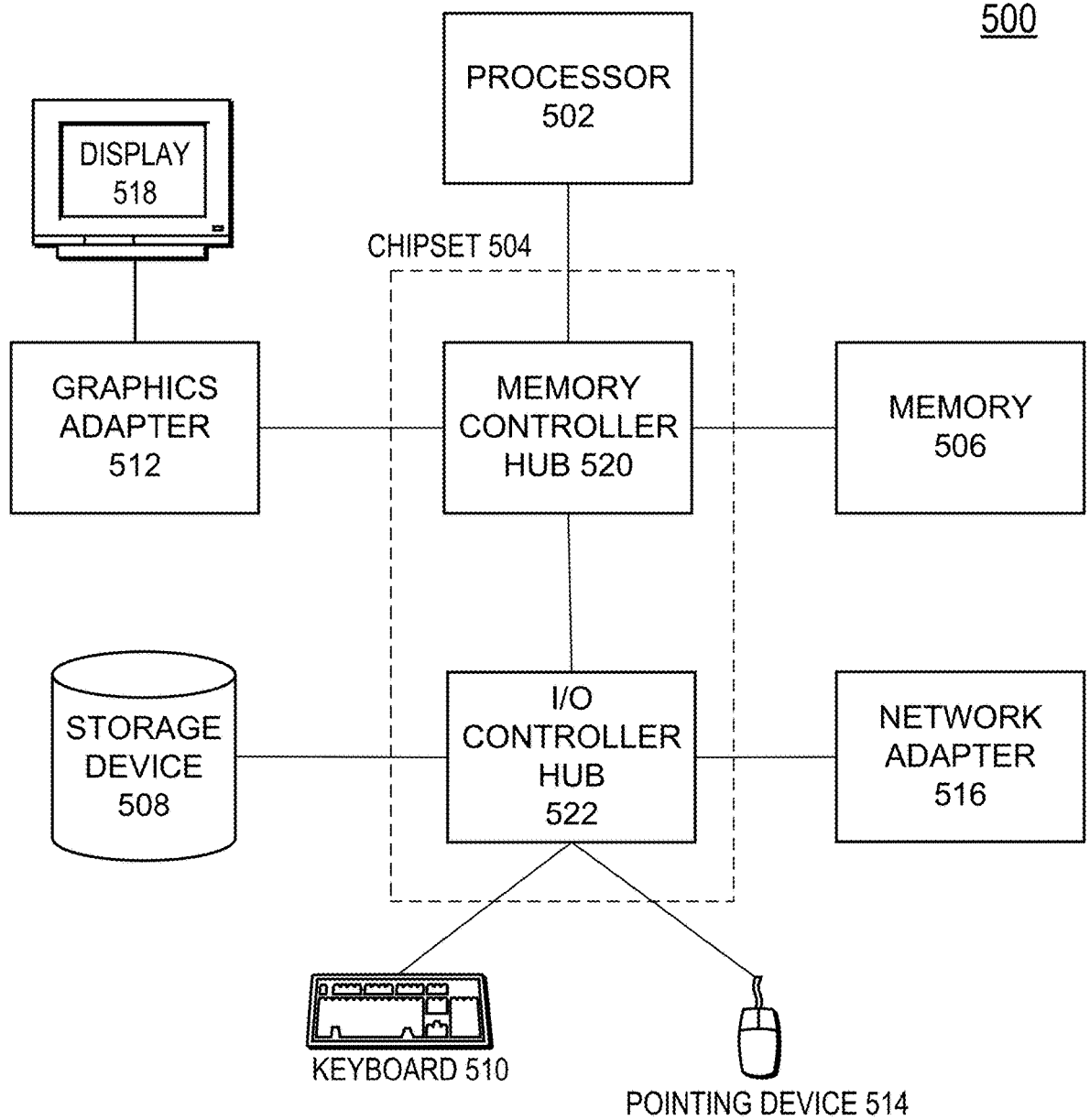
FIG. 5 is a high-level block diagram illustrating physical components of a computer used as part or all of the system from FIG. 1, according to one embodiment.

FIG. 5 is a high-level block diagram illustrating physical components of a computer 500 used as part or all of the system 100 from FIG. 1, according to one embodiment. Illustrated are at least one processor 502 coupled to a chipset 504. Also coupled to the chipset 504 are a memory 506, a storage device 508, a graphics adapter 512, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The graphics adapter 512 displays images and other information on the display 518. The network adapter 516 couples the computer 500 to a local or wide area network.

As is known in the art, a computer 500 can have different and/or other components than those shown in FIG. 5. In addition, the computer 500 can lack certain illustrated components. In one embodiment, a computer 500 acting as a server may lack a graphics adapter 512, and/or display 518, as well as a keyboard 510 or pointing device 514. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

The processes described above can be implemented on different types of computer systems, including multi-tenant computer systems. In a multi-tenant computer system, multiple tenants share the use of a computer system, but without access or knowledge to each other's data or activities. Each tenant may be an enterprise. As an example, one tenant might be a company that employs a sales force where each salesperson uses a client device to manage their sales process. Thus, a user might maintain contact data, leads data, customer follow-up data, performance data, goals and progress data, etc., all applicable to that user's personal sales process.

In one embodiment, a multi-tenant computer system implements a web-based customer relationship management (CRM) system. For example, the system includes application servers configured to implement and execute CRM software applications as well as provide related data, code, forms, webpages and other information to and from client devices and to store to, and retrieve from, a database system related data, objects, and webpage content. The capabilities described above are part of the CRM software applications. The activity being analyzed may be past, current and future sales transactions.

With a multi-tenant system, data for multiple tenants may be stored in the same physical database. However, tenant data typically is arranged so that data of one tenant is kept logically separate from that of other tenants so that one tenant does not have access to another tenant's data, unless such data is expressly shared. A tenant metadata store stores information that allows identification of data for different tenants, for example, using identifiers that uniquely identify each tenant.

In certain embodiments, the system implements applications other than, or in addition to, a CRM application. For example, the system may provide tenant access to multiple hosted (standard and custom) applications, including a CRM application. According to one embodiment, the system is configured to provide webpages, forms, applications, data and media content to client devices to support the access by client devices as tenants of system. As such, the system provides security mechanisms to keep each tenant's data separate unless the data is shared.

A multi-tenant system may implement security protocols that keep data, applications, and application use separate for different tenants. In addition to user-specific data and tenant-specific data, the system may maintain system level data usable by multiple tenants or other data. Such system level data may include industry reports, news, postings, and the like that are sharable among tenants.

The processes described above may also be implemented on other types of systems, for example client-server systems, mobile technology and devices, mobile networks, wearable devices, tablets, PCs, software-as-a-service, etc.

Alternate embodiments are implemented in computer hardware, firmware, software, and/or combinations thereof. Implementations can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random-access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

Although the detailed description contains many specifics, these should not be construed as limiting the scope of this disclosure but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of patent rights should be determined by the appended claims and their legal equivalents.

What is claimed is:

1. A computer-implemented method for location of text of key-value pairs on a form image, the computer-implemented method comprising:
   obtaining, at one or more processors, a form image originating from a client device;
   identifying, by the one or more processors using a neural network, regions of text within the form image;
   selecting, by the one or more processors, a form template from a database storing a plurality of form templates according to the identified regions of text;
   computing, by the one or more processors, a spatial mapping between the selected form template and the obtained form image, wherein the spatial mapping reflects shape and position changes between the selected form template and the obtained form image, and wherein computing the spatial mapping comprises:
      identifying label texts for keys of the selected form template,
      identifying the label texts for the keys in the obtained form image, and
      comparing regions of the identified label texts in the selected form template with regions of the identified label texts in the obtained form image;
   computing, by the one or more processors, spatial relationships between key regions and value regions of the selected form template;
   determining, by the one or more processors, for each key of a plurality of keys of the selected form template, using the computed spatial mappings and spatial relationships, an estimated region on the form image for the value corresponding to the key; and
   extracting, by the one or more processors, from the estimated regions on the form image based on overlap of the identified text regions and the estimated regions, text corresponding to values of the plurality of keys of the selected form template.

2. The computer-implemented method of claim 1, further comprising determining a template type for the obtained template by using a model trained by a machine learning algorithm.

3. The computer-implemented method of claim 1, further comprising obtaining, from the client device, an indicator of a template type for the obtained template.

4. The computer-implemented method of claim 3, the form template being selected in part using the obtained template type.

5. The computer-implemented method of claim 1, the selecting the form template comprising matching locations of the identified regions of text with locations in which the form templates indicate that text is to be found.

6. The computer-implemented method of claim 1, the selecting the form template comprising matching key labels specified by the form templates with text form the identified regions of text.

7. The computer-implemented method of claim 1, wherein the spatial mapping is a linear mapping specifying a scaling component and a shift component.

8. The computer-implemented method of claim 1, wherein the spatial relationships comprise at least one of a horizontal gap or a vertical gap between a key label region and a corresponding value region.

9. The computer-implemented method of claim 1, wherein determining an estimated region on the form image for the value corresponding to a key comprises:
   responsive to determining that the key has label text on the form image, determining the estimated region using the determined spatial relationship for the key.

10. The computer-implemented method of claim 1, wherein determining the estimated regions on the form image for the value corresponding to the key comprises:
   responsive to determining that a key lacks label text on the form image, determining the estimated region using the determined spatial mapping.

11. A non-transitory computer-readable storage medium containing instructions that when executed by a computer processor perform actions comprising:
   obtaining, at one or more processors, a form image originating from a client device;
   identifying, by the one or more processors using a neural network, regions of text within the form image;
   selecting, by the one or more processors, a form template from a database storing a plurality of form templates according to the identified regions of text;
   computing, by the one or more processors, a spatial mapping between the selected form template and the obtained form image, wherein the spatial mapping reflects shape and position changes between the selected form template and the obtained form image, and wherein computing the spatial mapping comprises:
      identifying label texts for keys of the selected form template,
      identifying the label texts for the keys in the obtained form image, and
      comparing regions of the identified label texts in the selected form template with regions of the identified label texts in the obtained form image;
   computing, by the one or more processors, spatial relationships between key regions and value regions of the selected form template;
   determining, by the one or more processors, for each key of a plurality of keys of the selected form template, using the computed spatial mappings and spatial relationships, an estimated region on the form image for the value corresponding to the key; and
   extracting, by the one or more processors, from the estimated regions on the form image based on overlap of the identified text regions and the estimated regions, text corresponding to values of the plurality of keys of the selected form template.

12. The non-transitory computer-readable storage medium of claim 11, the actions further comprising determining a template type for the obtained template by using a model trained by a machine learning algorithm.

13. The non-transitory computer-readable storage medium of claim 11, the actions further comprising obtaining, from the client device, an indicator of a template type for the obtained template.

14. The non-transitory computer-readable storage medium of claim 13, the form template being selected in part using the obtained template type.

15. The non-transitory computer-readable storage medium of claim 11, the selecting the form template comprising matching locations of the identified regions of text with locations in which the form templates indicate that text is to be found.

16. The non-transitory computer-readable storage medium of claim 11, the selecting the form template comprising matching key labels specified by the form templates with text form the identified regions of text.

17. The non-transitory computer-readable storage medium of claim 11, wherein the spatial mapping is a linear mapping specifying a scaling component and a shift component.

18. The non-transitory computer-readable storage medium of claim 11, wherein the spatial relationships comprise at least one of a horizontal gap or a vertical gap between a key label region and a corresponding value region.

19. The non-transitory computer-readable storage medium of claim 11, wherein determining an estimated region on the form image for the value corresponding to a key comprises:
  responsive to determining that the key has label text on the form image, determining the estimated region using the determined spatial relationship for the key.

20. The non-transitory computer-readable storage medium of claim 11, wherein determining the estimated regions on the form image for the value corresponding to the key comprises:
  responsive to determining that a key lacks label text on the form image, determining the estimated region using the determined spatial mapping.

* * * * *